US008094721B2

(12) United States Patent
Song et al.

(10) Patent No.: US 8,094,721 B2
(45) Date of Patent: Jan. 10, 2012

(54) METHODS AND APPARATUSES FOR SELECTING A MODE WITHIN A COMPRESSION SCHEME

(75) Inventors: Xudong Song, Fremont, CA (US); Peter Xiao, Fremont, CA (US); Lei Zhu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 854 days.

(21) Appl. No.: 11/323,602

(22) Filed: Dec. 29, 2005

(65) Prior Publication Data

US 2007/0153896 A1   Jul. 5, 2007

(51) Int. Cl.
*H04N 7/12* (2006.01)

(52) U.S. Cl. .............................. 375/240.13; 375/240.12

(58) Field of Classification Search .................. 375/240, 375/240.01, 240.12, 240.13; 382/239
See application file for complete search history.

(56) References Cited

U.S. PATENT DOCUMENTS 7,200,275 B2 *   4/2007   Srinivasan et al. ............ 382/239

OTHER PUBLICATIONS

PCT Notification of Transmittal of the International Search Report and the Written Opinion of the International Searching Authority, or the Declaration, International Application No. PCT/US06/62740, International Filing Date: Dec. 29, 2006, Date of Mailing: Jul. 1, 2008, 11 pages.

* cited by examiner

*Primary Examiner* — Allen Wong (57) ABSTRACT

In one embodiment, the methods and apparatuses detect a current macroblock and an adjacent macroblock within the scene; detect a mode of the adjacent macroblock; and select a skip mode as a mode for the current macroblock based on the mode of the adjacent macroblock.

22 Claims, 5 Drawing Sheets

METHODS AND APPARATUSES FOR SELECTING A MODE WITHIN A COMPRESSION SCHEME

FIELD OF INVENTION

The present invention relates generally to selecting a mode within a compression scheme and, more particularly, selecting a mode within a compression scheme to optimize efficiency.

BACKGROUND

Different systems are utilized to increase efficiencies in transmitting information representing a scene from an originating device to a target device. In some instances, information representing the scene is utilized on the target device. Often times attempts at conserving bandwidth between the originating device and the target device is desirable.

SUMMARY

In one embodiment, the methods and apparatuses detect a current macroblock and an adjacent macroblock within the scene; detect a mode of the adjacent macroblock; and select a skip mode as a mode for the current macroblock based on the mode of the adjacent macroblock.

BRIEF DESCRIPTION OF THE DRAWINGS

The accompanying drawings, which are incorporated in and constitute a part of this specification, illustrate and explain one embodiment of the methods and apparatuses for selecting a mode within a compression scheme. In the drawings.

DETAILED DESCRIPTION

The following detailed description of the methods and apparatuses for selecting a mode within a compression scheme refers to the accompanying drawings. The detailed description is not intended to limit the methods and apparatuses for selecting a mode within a compression scheme. Instead, the scope of the methods and apparatuses for selecting a mode within a compression scheme is defined by the appended claims and equivalents. Those skilled in the art will recognize that many other implementations are possible, consistent with the present invention.

References to a device include a desktop computer, a portable computer, a personal digital assistant, a video phone, a landline telephone, a cellular telephone, and a device capable of receiving/transmitting an electronic signal.

Figure 1:
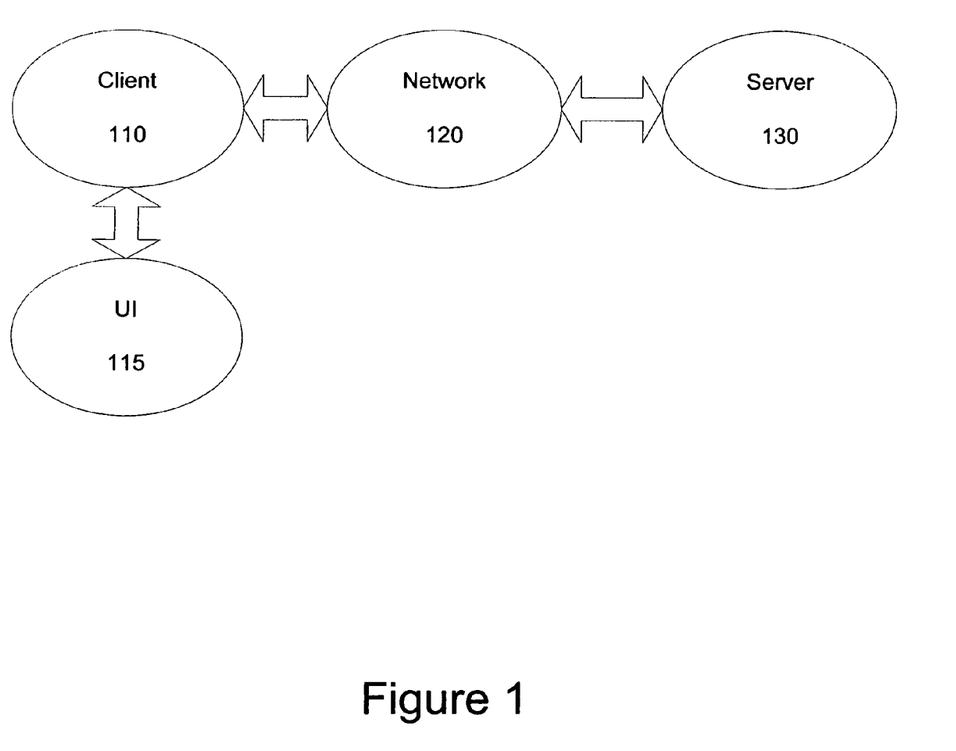
FIG. 1 is a diagram illustrating an environment within which the methods and apparatuses for selecting a mode within a compression scheme are implemented.

FIG. 1 is a diagram illustrating an environment within which the methods and apparatuses for selecting a mode within a compression scheme are implemented. The environment includes an electronic device 110 (e.g., a computing platform configured to act as a client device, such as a computer, a personal digital assistant, and the like), a user interface 115, a network 120 (e.g., a local area network, a home network, the Internet), and a server 130 (e.g., a computing platform configured to act as a server).

In one embodiment, one or more user interface 115, components are made integral with the electronic device 110 (e.g., keypad and video display screen input and output interfaces in the same housing such as a personal digital assistant. In other embodiments, one or more user interface 115 components (e.g., a keyboard, a pointing device such as a mouse, a trackball, etc.), a microphone, a speaker, a display, a camera are physically separate from, and are conventionally coupled to, electronic device 110. In one embodiment, the user utilizes interface 115 to access and control content and applications stored in electronic device 110, server 130, or a remote storage device (not shown) coupled via network 120.

In accordance with the invention, embodiments of selecting a mode within a compression scheme below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
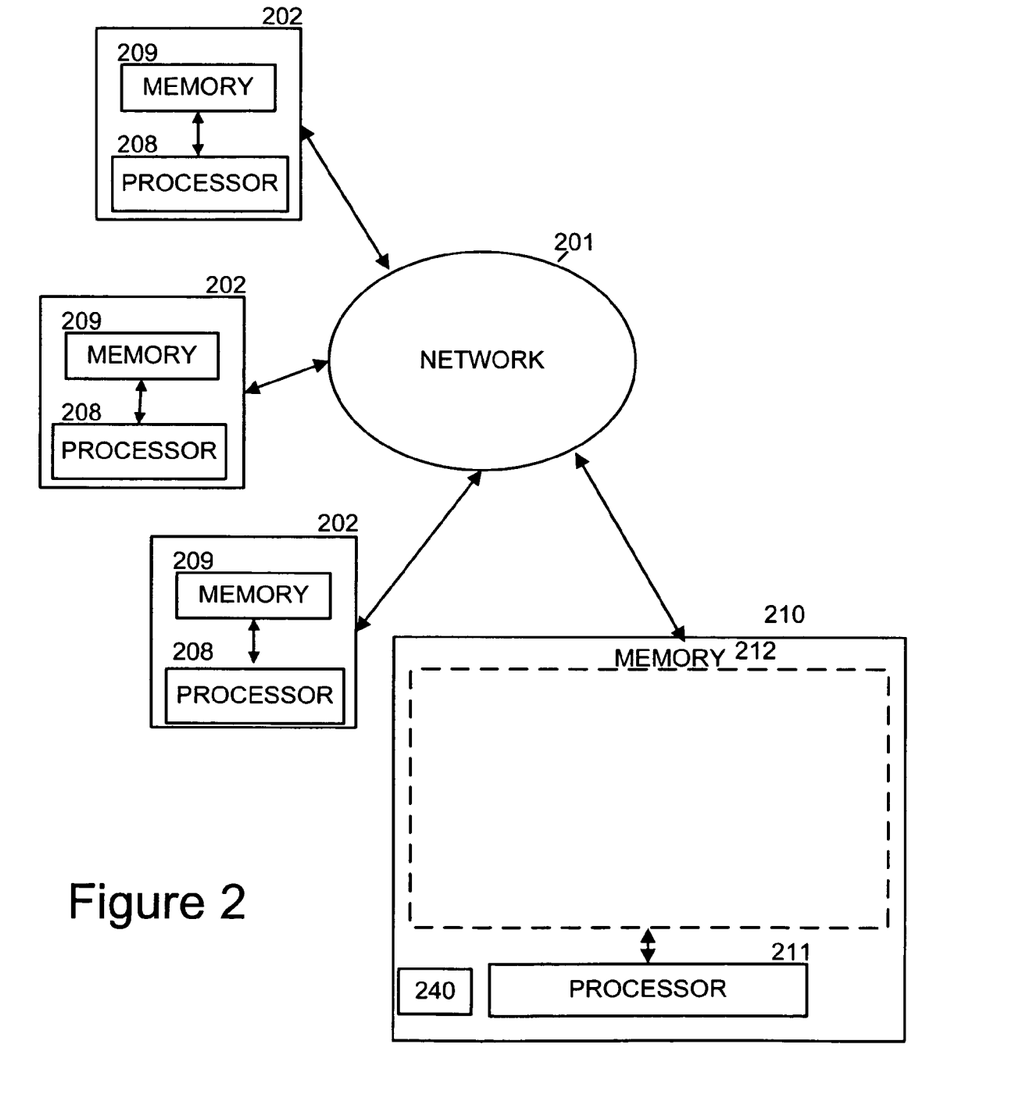
FIG. 2 is a simplified block diagram illustrating one embodiment in which the methods and apparatuses for selecting a mode within a compression scheme are implemented.

FIG. 2 is a simplified diagram illustrating an exemplary architecture in which the methods and apparatuses for selecting a mode within a compression scheme are implemented. The exemplary architecture includes a plurality of electronic devices 202, a server device 210, and a network 201 connecting electronic devices 202 to server 210 and each electronic device 202 to each other. The plurality of electronic devices 202 are each configured to include a computer-readable medium 209, such as random access memory, coupled to an electronic processor 208. Processor 208 executes program instructions stored in the computer-readable medium 209. In one embodiment, a unique user operates each electronic device 202 via an interface 115 as described with reference to FIG. 1.

The server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

In one embodiment, the plurality of client devices 202 and the server 210 include instructions for a customized application for communicating between messaging and telephony systems. In one embodiment, the plurality of computer-readable media 209 and 212 contain, in part, the customized application. Additionally, the plurality of client devices 202 and the server 210 are configured to receive and transmit electronic messages for use with the customized application. Similarly, the network 210 is configured to transmit electronic messages for use with the customized application.

One or more user applications are stored in media 209, in media 212, or a single user application is stored in part in one media 209 and in part in media 212. In one instance, a stored user application, regardless of storage location, is made customizable based selecting a mode within a compression scheme using embodiments described below.

Figure 3:
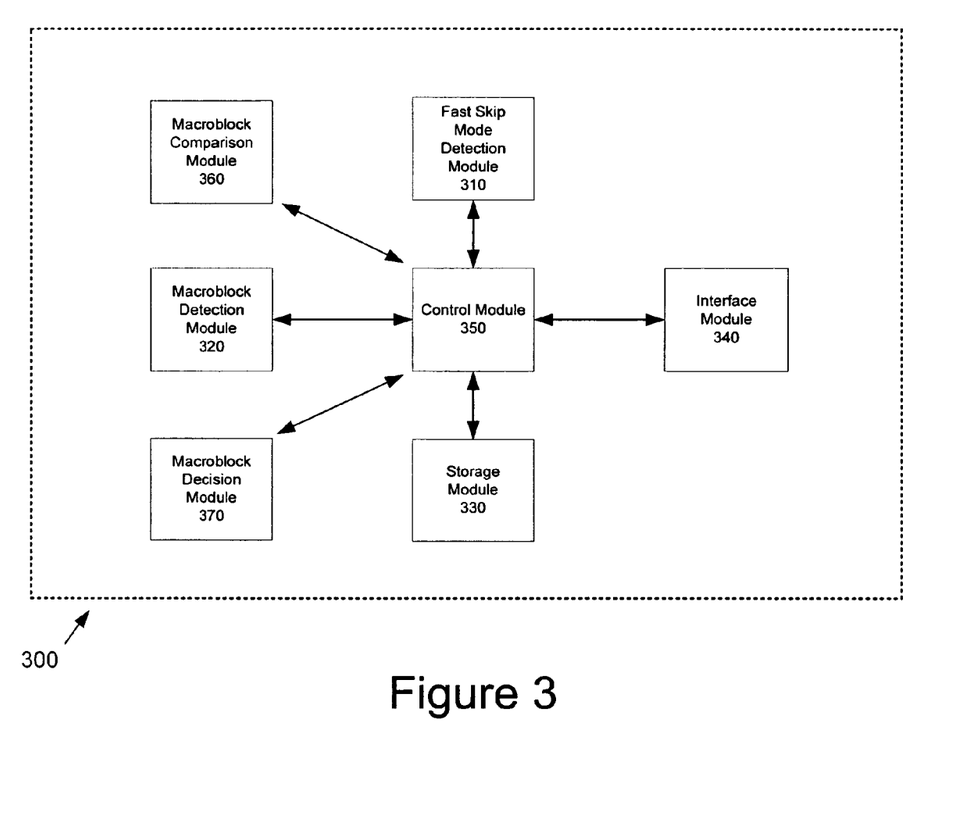
FIG. 3 is a simplified block diagram illustrating a system, consistent with one embodiment of the methods and apparatuses for selecting a mode within a compression scheme.

FIG. 3 illustrates one embodiment of a system 300. In one embodiment, the system 300 is embodied within the server 130. In another embodiment, the system 300 is embodied within the electronic device 110. In yet another embodiment, the system 300 is embodied within both the electronic device 110 and the server 130.

In one embodiment, the system 300 includes a fast skip mode detection module 310, a macroblock detection module 320, a storage module 330, an interface module 340, a control module 350, a macroblock comparison module 360, and a macroblock decision module 370.

In one embodiment, the control module 350 communicates with the fast skip mode detection module 310, the macroblock detection module 320, the storage module 330, an interface module 340, the macroblock comparison module 360, and the macroblock decision module 370. In one embodiment, the control module 350 coordinates tasks, requests, and communications between the fast skip mode detection module 310, the macroblock detection module 320, the storage module 330, an interface module 340, the macroblock comparison module 360, and the macroblock decision module 370.

In one embodiment, the fast skip mode detection module 310 detects data encoded with a fast skip mode.

In one embodiment, the macroblock detection module 320 also detects the encoding information of neighboring macroblocks. The encoding information may include a skip mode, an inter mode, and an intra mode.

In one embodiment, the storage module 330 stores encoding information related to each of the macroblocks. In another embodiment, the storage module 330 also temporarily stores the macroblocks.

In one embodiment, the interface module 340 detects scenes from outside devices. Further, the interface module 340 also returns encoding information related to each macroblock.

In one embodiment, the macroblock comparison module 360 compares multiple macroblocks that comprise a scene. In one embodiment, the macroblock comparison module compares a macroblock with another macroblock relative to spatial correlation. In another embodiment, the macroblock comparison module compares a macroblock with another macroblock relative to temporal correlation.

In one embodiment, the macroblock decision module 370 assigns encoding information to a particular macroblock. The encoding information may include a skip mode, an inter mode, and an intra mode. In one embodiment, the macroblock decision module 370 assigns the encoding information for a particular macroblock based on the encoding information of neighboring macroblocks and comparisons with other macroblocks.

The system 300 in FIG. 3 is shown for exemplary purposes and is merely one embodiment of the methods and apparatuses for selecting a mode within a compression scheme. Additional modules may be added to the system 300 without departing from the scope of the methods and apparatuses for selecting a mode within a compression scheme. Similarly, modules may be combined or deleted without departing from the scope of the methods and apparatuses for selecting a mode within a compression scheme.

Figure 4:
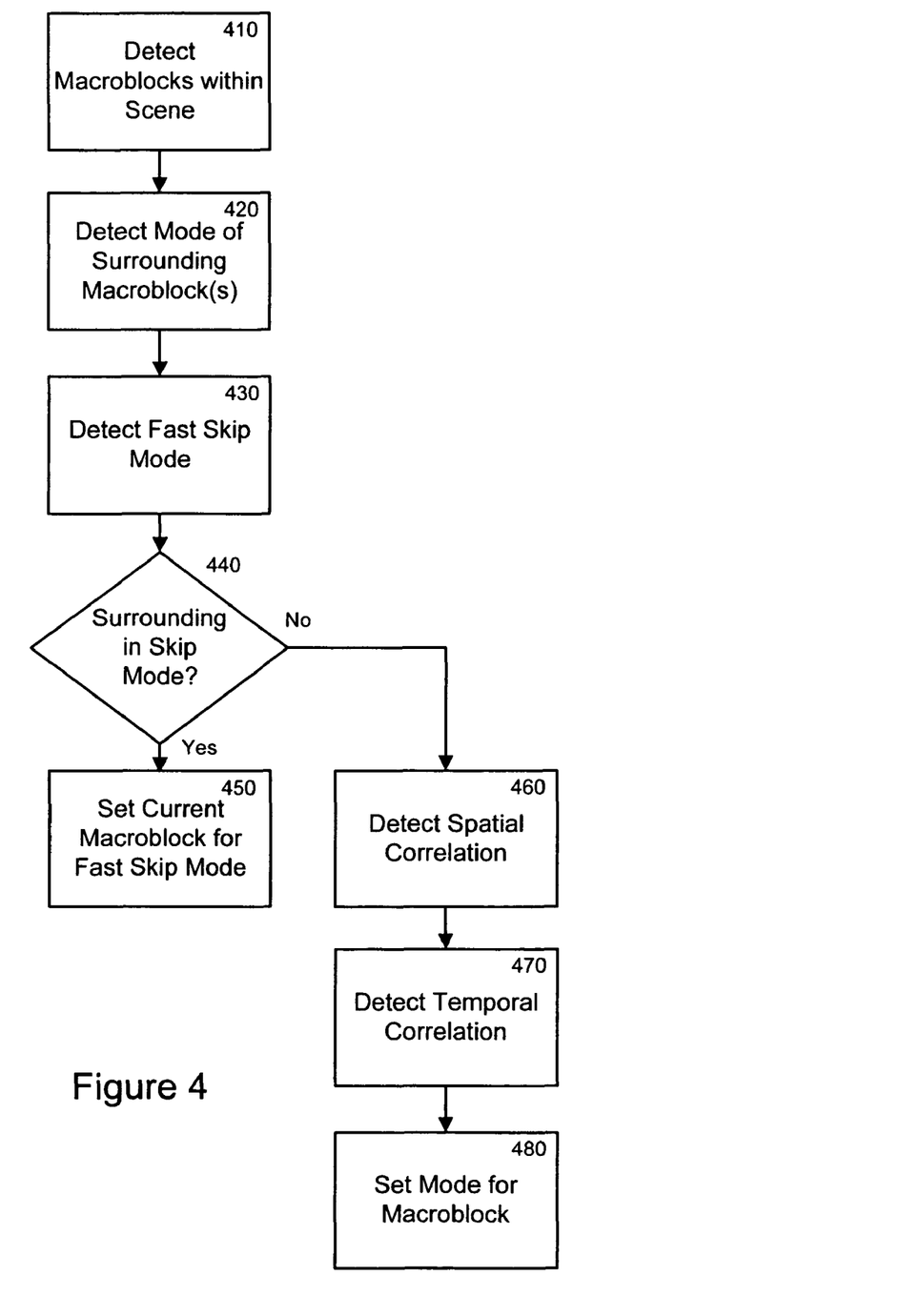
FIG. 4 is a flow diagram consistent with one embodiment of the methods and apparatuses for selecting a mode within a compression scheme.

The flow diagram as depicted in FIG. 4 is one embodiment of the methods and apparatuses for selecting a mode within a compression scheme. The blocks within the flow diagram can be performed in a different sequence without departing from the spirit of the methods and apparatuses selecting a mode within a compression scheme. Further, blocks can be deleted, added, or combined without departing from the spirit of the methods and apparatuses for selecting a mode within a compression scheme.

The flow diagram in FIG. 4 illustrates selecting a mode for a macroblock within a compression scheme according to one embodiment of the invention.

In Block 410, a macroblock is detected within the scene. In one embodiment, multiple macroblocks comprise the scene. In one embodiment, each of the macroblocks is capable of being encoded with a mode such as a skip mode, an inter mode, and an intra mode.

In Block 420, surrounding macroblocks associated with the macroblock detected within the Block 410 are detected within the scene. In one embodiment, the encoded information associated with each of the surrounding macroblocks is also detected.

In Block 430, a fast skip mode within a macroblock is detected. In one embodiment, the detection of the fast skip mode is performed by the fast skip mode detection module 310 through the interface module 340.

In Block 440, if there are sufficient surrounding macroblocks that are encoded with a fast skip mode, then the current macro block is encoded also as a fast skip mode in Block 450. In one embodiment, a threshold level is met when a sufficient number of macroblocks are encoded with the skip mode.

In one embodiment, the threshold level is met when there are multiple more than one surrounding macroblock is encoded with the skip mode. In another embodiment, the threshold level is met when a single surrounding macroblock is encoded with the skip mode when there is only a single surrounding macroblock.

In use within a video conferencing application, motion activities are typically categorized low and medium with respect to changes in motion. This results in a substantial number of zero motion vector blocks. Moreover, it is likely that skip modes for neighboring 16×16 macroblock are highly correlated. For example, if previously-encoded 16×16 macroblocks A and B in FIG. 5 were encoded using skip mode, it is very likely that the best mode for current macroblock C is also skip mode.

Figure 5:
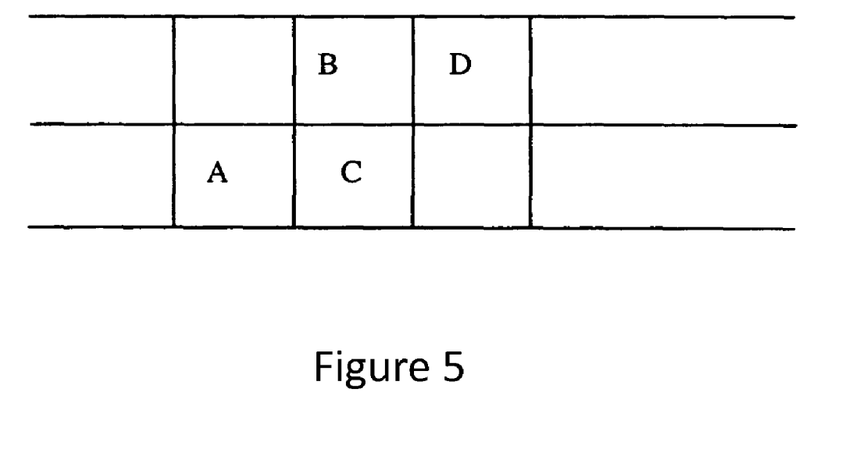
FIG. 5 is a diagram illustrating one embodiment of the methods and apparatuses for selecting a mode within a compression scheme.

Based on these observations, a fast decision to utilize the skip mode is typically made at an early stage. Once the mode of the current block C is determined to skip, the other inter and intra modes are not investigated further. By not considering the inter and intra modes encoding time is minimized. The pseudo code of fast skip mode decision in P frame is below.

```
If( Mode_A == SKIP || Mode_B ==SKIP || Mode_D == SKIP){
MV_C = MED(MV_A, MV_B, MV_D);
Motion compensation using MV_C;
Transform motion compensated difference;
Quantize transform coefficients;
If(all quantized coefficients == 0)
{
Mode_C = SKIP;
}
}
```

In Block 450, the current macroblock is encoded with the skip mode. After encoding the current macroblock with the skip mode, further examination of surrounding macroblocks is not needed and encoding of the current macroblock is complete.

In the Block 440, if the threshold level is not met based on the surrounding macroblocks, then the spatial correlation between the current macroblock and the surrounding macroblocks is determined in Block 460. In another embodiment, if the fast skip mode is not detected within the Block 440, then the temporal correlation between the current macroblock and the surrounding macroblocks is determined in Block 460.

In the Block 460, the spatial correlation between the current macroblocks and the surrounding macroblocks is determined.

In one embodiment, the spatial correlation between the current and adjacent macroblocks is measured by the sum of absolute Hardamard transform difference between the current macroblock and its prediction.

One embodiment is shown by the following equation:

$$J_s = SATD + \lambda \times R \quad \text{(Equation 1)}$$

In this instance, SATD represents the sum of the absolute transform coefficient differences that is defined by:

$$SATD = \sum_{x=0}^{15} \sum_{y=0}^{15} |T(I_Y(x, y) - P_Y(x, y))|, \quad \text{(Equation 2)}$$

Figure 6:
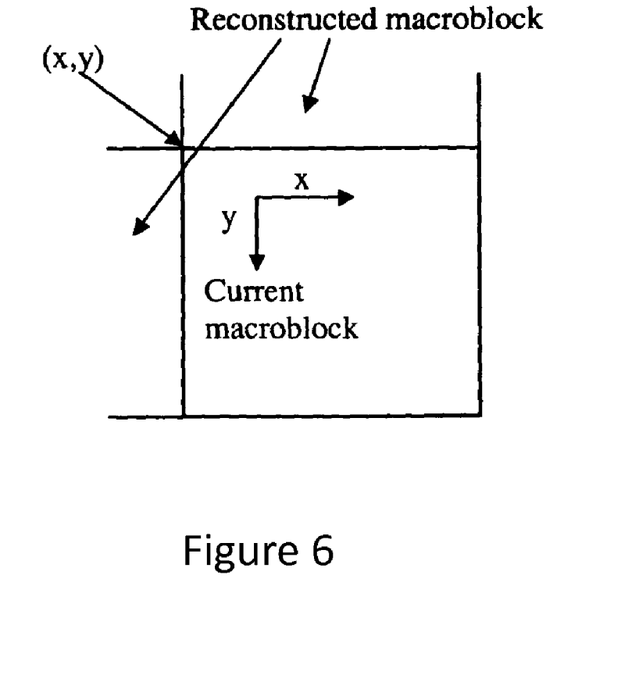
FIG. 6 is a diagram illustrating one embodiment of the methods and apparatuses for selecting a mode within a compression scheme.

In this instance, T is the separable Hardamard transform with 4-points along each dimension, $I_y$ and $P_y$ that represents the current luminance block and its luminance prediction, respectively. The (x,y) portion indicates spatial position of the upper-most left pixel in luminance block as shown in FIG. 6.

In this instance, the $\lambda$ is the Lagrangian multiplier depending on the quantization parameter (QP) per macroblock, which is defined by the following:

$$\lambda = 0.85 \times 2^{QP/3} \quad \text{(Equation 3)}$$

Where R represents the number of bits associated with this mode. $P_y(x,y)$ is predicted by adjacent pixels in the upper and the left macroblocks that are decoded earlier.

Depending on the availability of neighboring macroblocks, there are four cases in predicting $P_y(x,y)$.

In the first case, the left macroblock and upper macroblock are both available; the following equation is utilized:

$$P_Y(x, y) = \left( \sum_{i=0}^{15} I(i, -1) + \sum_{j=0}^{15} I(-1, j) + 16 \right) >> 5 \quad \text{(Equation 4)}$$

In the second case, the left macroblock is available, and the upper macroblock is not available; the following equation is utilized:

$$P_Y(x, y) = \left( \sum_{j=0}^{15} I(-1, j) + 8 \right) >> 4 \quad \text{(Equation 5)}$$

In the third case, the left macroblock is not available, and the upper macroblock is available; the following equation is utilized:

$$P_Y(x, y) = \left( \sum_{i=0}^{15} I(i, -1) + 8 \right) >> 4 \quad \text{(Equation 6)}$$

In the fourth case, the left macroblock is not available, and the upper macroblock is not available; the following equation is utilized:

$$P_y(x,y) = 128 \quad \text{(Equation 7)}$$

In the Block 470, the temporal correlation between the current macroblocks and the surrounding macroblocks is determined.

In one embodiment, the temporal correlation is measured by the sum of absolute Hardamard transform difference between the current macroblock and its best matched macroblock with respect to the previous frame.

In one instance, the temporal correlation is demonstrated by the following equation:

$$J_t = SATD_{DFD} + \lambda_{MOTION} \times R_M \quad \text{(Equation 8)}$$

In this instance, the $SATD_{DFD}$ denotes the sum of the absolute differences after Hadamard transform between the current macroblock in the current frame and its best matched macroblock in the previous frame. The expression for $SATD_{DFD}$ is illustrated by:

$$SATD_{DFD} = \sum_{x=0}^{15} \sum_{y=0}^{15} |T(I_Y(x, y) - K_Y(x + v_x, y + v_y))| \quad \text{(Equation 9)}$$

In this instance, T is the separable Hardamard transform with 4-points along each dimension. Further, $I_y(x,y)$ and $K_y(x+v_x, y+v_y)$ are pixels of the current luminance macroblock and its best matched one, respectively.

Further, $\lambda_{MOTION}$ is the Lagrange multiplier and is represented by:

$$\lambda_{MOTION} = \sqrt{0.85 \times 2^{QP/3}} \quad \text{(Equation 10)}$$

$R_M$ represents the number of bits for encoding motion information.

In Block 480, a mode is encoded for the current macroblock based on the spatial correlation and the temporal correlation between the current macroblock and the surrounding macroblocks. In one embodiment, the current macroblock is encoded with either the inter mode or the intra mode.

In use within a video conferencing application, the inter mode typically has higher probability of being selected compared to the intra mode. Therefore, $J_s > \alpha \times J_t$, where $\alpha$ is an inter mode favored parameter. In one embodiment, $\alpha = 0.95$. Further, the inter mode is selected for the current encoded macroblock without performing the computationally intensive either intra or inter mode decision as shown by the Blocks 460 and 470. By eliminating the computations associated with the Blocks 460 and 470, encoding the current macroblock occurs faster.

In one embodiment, the proposed fast INTER/INTRA mode decision scheme can be summarized with the following pseudo-code:

```
If (MODE_LEFT_MACROBLOK == SKIP || MODE_TOP_MACROBLOCK ==
SKIP ||
MODE_TOP_RIGHT_MACROBLOCK == SKIP){
MV_CURRENT_MACROBLOCK =
MED(MV_LEFT_MACROBLOCK, MV_TOP_MACROBLOCK,
MV_TOP_RIGHT_MACROBLOCK);
Motion compensation using MV_CURRENT_MACROBLOCK;
Transform motion compensated difference;
Quantize transform coefficients;
If (all - quantized - coefficients == 0){
```

-continued

```
MODE_CURRENT_MACROBLOCK = SKIP;
  }
}
```

For the remaining macroblocks, the following pseudo code represents the decision process:

```
If ( J_s < α × J_t ){
  Compute J_INTRA4×4 RD COST for Intra 4×4 block;
  If ( J_s < J_INTRA4×4 ){
    MODE_CURRENT_MACROBLOCK = INTRA16×16;
  }
  else{
    MODE_CURRENT_MACROBLOCK = INTRA4×4;
  }
}
else{
  MODE_CURRENT_MACROBLOCK ∈
  {SKIP,INTER16×16,INTER16×8,INTER8×16,
   INTER8×8,INTER8×4,INTER4×8,INTER4×4};
}
```

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A method comprising:
    detecting, by an electronic device, a current macroblock and one or more adjacent macroblocks within a scene;
    detecting, by the electronic device, a mode of the one or more adjacent macroblocks;
    in response to there being a threshold number of the one or more adjacent macroblocks that are encoded with a skip mode, selecting the skip mode as a mode for the current macroblock; and
    in response to there not being the threshold number of the one or more adjacent macroblocks that are encoded with the skip mode,
        detecting a spatial correlation between the current macroblock and the one or more adjacent macroblocks, and
        based at least on the spatial correlation, selecting either an inter mode or an intra mode as the mode for the current macroblock.

2. The method according to claim 1 wherein the scene represents visual data.

3. The method according to claim 1 wherein the inter mode is selected as the mode of the current macroblock based at least on the spatial correlation.

4. The method according to claim 1 wherein the intra mode is selected as the mode of the current macroblock based at least on the spatial correlation.

5. The method according to claim 1 further comprising in response to there not being the threshold number of the one or more adjacent macroblocks that are encoded with the skip mode, detecting a temporal correlation between the current macroblock and the one or more adjacent macroblocks.

6. The method according to claim 5 further comprising selecting an inter mode for the mode of the current macroblock based at least on the temporal correlation.

7. The method according to claim 5 further comprising selecting an intra mode for the mode of the current macroblock based at least on the temporal correlation.

8. The method according to claim 1 further comprising storing the mode of the current macroblock.

9. The method according to claim 1, wherein the electronic device is a server.

10. The method according to claim 1, wherein the threshold number is met when a single adjacent macroblock is encoded with the skip mode.

11. The method according to claim 1, wherein the inter mode and the intra mode are not investigated for the current macroblock once the mode of the current macroblock has been selected as the skip mode.

12. The method of claim 1 wherein each macroblock comprises a 16×16 group of pixels within the scene.

13. A system comprising:
    means for detecting a current macroblock and one or more adjacent macroblocks within the scene;
    means for detecting a mode of the one or more adjacent macroblocks;
    means for selecting a skip mode for the current macroblock in response to there being a threshold number of the one or more adjacent macroblocks that are encoded with the skip mode, and, in response to there not being the threshold number of the one or more adjacent macroblocks that are encoded with the skip mode, detecting a spatial correlation between the current macroblock and the one or more adjacent macroblocks and selecting either an inter mode or an intra mode as the mode for the current macroblock based at least on the spatial correlation.

14. The system according to claim 13 further comprising means for detecting a temporal correlation between the current macroblock and the one or more adjacent macroblocks in response to there not being the threshold number of the one or more adjacent macroblocks that are encoded with the skip mode.

15. A method comprising:
    detecting, by an electronic device, a current macroblock within a scene;
    detecting, by the electronic device, a mode of a plurality of surrounding macroblocks associated with the current macroblock;
    determining, by the electronic device, whether a threshold number of the surrounding macroblocks are set to a macroblock skip mode;
    in response to determining that the threshold number of the surrounding macroblocks are set to the macroblock skip mode, and absent consideration of a spatial correlation between the current macroblock and the surrounding macroblocks, setting the current macroblock to have the macroblock skip mode;
    in response to determining that the threshold number of the surrounding macroblocks are not set to the macroblock skip mode,
        detecting the spatial correlation between the current macroblock and the surrounding macroblocks, and
        based at least on the spatial correlation, selecting either an inter mode or an intra mode as the mode of the current macroblock; and
    storing the mode of the current macroblock.

16. The method of claim 15 wherein the threshold number is greater than two.

17. The method of claim 15, wherein the current macroblock is set to have a macroblock skip mode absent consideration of a temporal correlation between the current macroblock and the surrounding macroblocks.

18. The method of claim 15 wherein each macroblock comprises a 16×16 group of pixels within the scene.

19. The method according to claim 15, wherein the electronic device is a server.

20. A system, comprising:
a processor; and
a memory configured to store a plurality of software modules executable by the processor, the software modules including,
a detection module configured to detect a current macroblock within a scene,
a macroblock comparison module configured to detect a mode of a plurality of surrounding macroblocks associated with the current macroblock,
a macroblock decision module configured to, absent consideration of a spatial correlation between the current macroblock and the plurality of surrounding macroblocks, that a threshold number of the plurality of surrounding macroblocks are set to the macroblock skip mode, set the current macroblock to have a macroblock skip mode in response to a determination, and
the macroblock decision module further configured to, in response to a determination that the threshold number of the plurality of surrounding macroblocks are not set to the macroblock skip mode, detect the spatial correlation between the current macroblock and the plurality of surrounding macroblocks and set the current macroblock to either a macroblock inter mode or a macroblock intra mode based at least on the spatial correlation.

21. The system according to claim 20 further comprising a storage module configured to store the mode of the current macroblock.

22. The system according to claim 20 wherein the macroblock comparison module detects a temporal correlation between the current macroblock and the one or more adjacent macroblocks.

* * * * *